United States Patent
Schultz et al.

(10) Patent No.: US 8,197,133 B2
(45) Date of Patent: Jun. 12, 2012

(54) SYSTEM AND METHOD FOR SENSOR THERMAL DRIFT OFFSET COMPENSATION

(75) Inventors: Al Schultz, Center Valley, PA (US);
Chris Mazza, Harleysville, PA (US);
Gary Conner, Harleysville, PA (US)

(73) Assignee: Brooks Instruments, LLC, Hatfield, PA (US)

( * ) Notice: Subject to any disclaimer, the term of this patent is extended or adjusted under 35 U.S.C. 154(b) by 328 days.

(21) Appl. No.: 12/325,465

(22) Filed: Dec. 1, 2008

(65) Prior Publication Data
US 2009/0212847 A1    Aug. 27, 2009

Related U.S. Application Data

(60) Provisional application No. 61/066,695, filed on Feb. 22, 2008.

(51) Int. Cl.
*G01K 15/00* (2006.01)
*G01K 7/00* (2006.01)

(52) U.S. Cl. .......... 374/170; 374/172; 374/171; 374/1; 374/183

(58) Field of Classification Search .......... 374/170, 374/171, 173, 1, 183, 172
See application file for complete search history.

(56) References Cited

U.S. PATENT DOCUMENTS

| | | | |
|---|---|---|---|
| 4,807,151 A * | 2/1989 | Citron | 702/47 |
| 6,470,741 B1 * | 10/2002 | Fathollahzadeh | 73/204.15 |
| 6,900,888 B2 | 5/2005 | Yoshida et al. | |
| 7,651,263 B2 * | 1/2010 | Zolock et al. | 374/110 |
| 2004/0144178 A1 | 7/2004 | Ohmi et al. | |
| 2008/0121033 A1 * | 5/2008 | Molnar | 73/204.14 |
| 2009/0201969 A1 * | 8/2009 | Krauss et al. | 374/1 |

FOREIGN PATENT DOCUMENTS
EP    1 460 401 A1    9/2004

OTHER PUBLICATIONS
International Search Report and Written Opinion date mailed Apr. 17, 2009; International Patent Application No. PCT/US2009/34739.

* cited by examiner

*Primary Examiner* — Lisa Caputo
*Assistant Examiner* — Mirellys Jagan
(74) *Attorney, Agent, or Firm* — Patton Boggs, LLP

(57) ABSTRACT

A system and method for compensating for thermal drift. A temperature is measured in a meter as a temperature voltage. The temperature voltage is converted to a digital signal. The digital signal is processed to generate an offset voltage in response to the digital signal. The offset voltage is applied as an input to an amplifier. The amplifier receives as a second input a gauge voltage. An output is generated from the meter that corrects the gauge voltage using the offset voltage to compensate for thermal drift.

11 Claims, 3 Drawing Sheets

SYSTEM AND METHOD FOR SENSOR THERMAL DRIFT OFFSET COMPENSATION

PRIORITY

This application claims priority to provisional application Ser. No. 61/066,695, filed on Feb. 22, 2008, which is incorporated herein by reference.

BACKGROUND OF THE INVENTION

Description of the Related Art

Manufacturing, development, and research facilities and processes often need to track the pressure and flow of liquids and gasses. In most cases, a pressure bridge sensor or thermal mass flow sensor are used to measure and control pressure or flow. It many cases, these sensors are utilized in environments, systems, and situations that require high accuracy. The electrical behavior of sensors may be highly dependent on the temperature gradient within the measurement environment. Maintaining accuracy in an environment with temperature changes may be difficult because of error introduced by thermal drift. Thermal drift is the change in measurements made by the sensor that occurs based on temperature changes.

Some sensors attempt to compensate for thermal drift error using software corrections. Software compensation for thermal drift error may reduce the usable range of the analog-to-digital converter input. Reducing the usable range of the analog-to-digital converter input may be significant for sensors that inherently have or experience a large thermal drift error reducing the accuracy and reliability of the sensor.

BRIEF SUMMARY OF THE INVENTION

One embodiment provides a system and method for compensating for thermal drift. A temperature may be measured in a meter as a temperature voltage. The temperature voltage may be converted to a digital signal. The digital signal is processed to generate an offset voltage in response to the digital signal. The offset voltage may be applied as an input to an amplifier. The amplifier may receive as a second input a gauge voltage. An output may be generated from the meter that corrects the gauge voltage using the offset voltage to compensate for thermal drift.

Another embodiment provides a meter. The meter may include a gauge outputting a gauge voltage. The meter may further include a temperature sensor configured to measure a temperature in the gauge. The meter may further include an analog-to-digital converter (ADC) in communication with the temperature sensor. The ADC may be configured to convert a temperature voltage measured by the temperature sensor to a digital signal. The meter may further include a processor in communication with the ADC. The processor may be configured to generate a offset signal based on the digital signal. The meter may further include a digital-to-analog converter (DAC) in communication with the processor. The DAC may be configured to convert the offset signal to an offset voltage. The meter may further include an instrumentation amplifier in communication with the gauge. The instrumentation amplifier may be configured to receive the gauge voltage and the offset voltage and output an amplified gauge voltage. The meter may further include a second ADC in communication with the instrumentation amplifier and the processor. The second ADC may be configured to convert the amplified gauge voltage to a digital output. The digital output may be processed by the processor for output from the meter.

Another embodiment provides a method for compensating for thermal drift in a meter. A temperature may be measured in a meter as a temperature voltage. The temperature voltage may be converted to a digital signal. An offset voltage may be generated in response to the digital signal. The offset voltage may be generated by performing polynomial conversion utilizing the digital signal. The offset voltage may be applied as an input to an amplifier. The amplifier may receive as a second input a gauge voltage to generate an amplified gauge voltage as an output. The amplified gauge voltage that has been amplified may be converted to a digital output. The digital output may be processed to generate an output from the meter that corrects the gauge voltage using the offset voltage to compensate for thermal drift.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

The illustrative embodiments provide a system and method for compensating for thermal drift in a flow or pressure meter. The flow gauge is a thermodynamic sensor for measuring flow in flow applications. The pressure gauge is a strain sensor for measuring pressure in a pressure application. In one embodiment, the meter may compensate for thermal drift before digitizing the signal output. The illustrative embodiments may increase the range and accuracy of the signal output from the meter.

Figure 1:
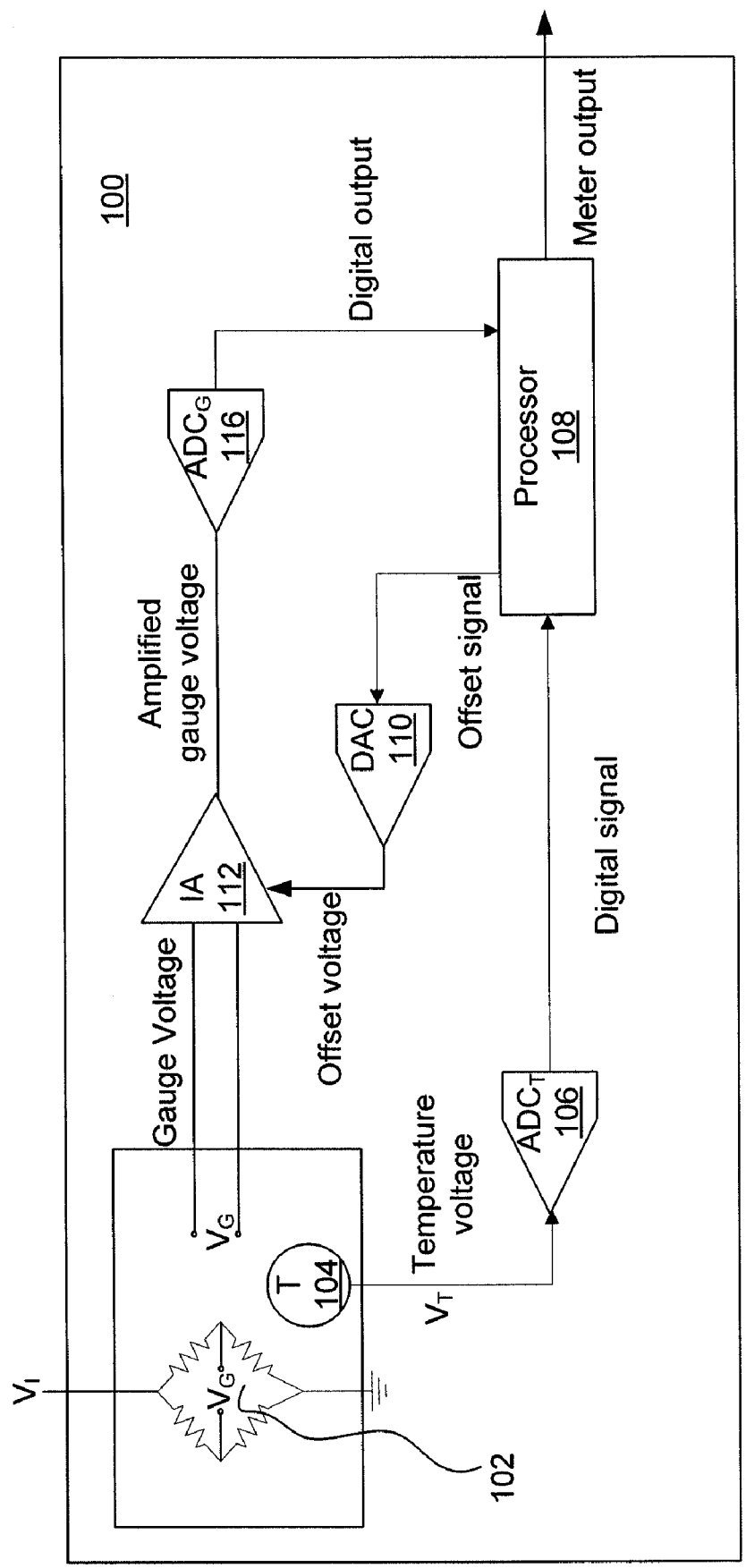
FIG. 1 is a pictorial representation of a meter for compensating for thermal drift in accordance with an illustrative embodiment.

FIG. 1 is a pictorial representation of a meter configured to compensate for thermal drift in accordance with an illustrative embodiment. In one embodiment, the meter 100 is a measurement instrument configured to detect or measure pressure or flow. The meter 100 may be used or integrated in any number of situations, conditions, environments, or systems. For example, the meter 100 may measure low-level flows of fluids for semiconductor wafer manufacturing. If the process and flow levels are not correct because of thermal drift during steps, such as deposition, the yield may be much lower costing time and money.

In one embodiment, the meter 100 may include a gauge 102 and temperature sensor 104, an analog-to-digital converter (ADC) 106, a processor 108, a digital-to-analog converter (DAC) 110, an instrumentation amplifier (IA) 112, and an ADC 116. The different elements of the meter 100 may communicate through leads, busses, circuit paths, wires, traces, vias, pins, or other conducting elements. In one embodiment, all or a portion of the meter 100 is an integrated circuit.

The gauge 102 is a sensor for making an electronic measurement of a physical phenomenon. In illustrative embodiments, the gauge 102 may be a bridge sensor, force sensor, strain gauge, flow sensor, or other pressure sensor. In one embodiment, the gauge 102 is a sensor that generates a differential output voltage or current based on resistance changes with the circuitry of the gauge 102. In one embodiment, the gauge 102 is a wheatstone bridge. The gauge 102 may be used in a flow environment in which small measurements of pressure and flow are critical. The flow and pressure measurements may be utilized to regulate and control other systems. The gauge 102 may be utilized in critical industries, such as biopharmaceuticals, oil and gas, fuel cell research, chemical manufacture, medical device manufacture, analytical instrumentation, and semiconductor manufacturing. For example, temperature variations may need to be compensated for during the thin film deposition processes utilized for semiconductor manufacturing.

The temperature sensor 104 is a sensor configured to measure temperature within the meter 100 that may affect or skew the readings of the gauge 102. In one embodiment, the temperature sensor 104 may output a temperature voltage. The temperature voltage from the temperature sensor may be converted by the ADC 106 to a digital signal indicating the temperature measured by the temperature sensor 104. The ADCs 106 and 116 are electronic devices that convert an input analog voltage to a digital signal, code, or value The digital signal may be any number of coding schemes, such as binary or two's compliment binary. Similarly, the DAC 110 is a device for converting a digital signal or code to an analog signal, such as a current voltage or electric charge. The DAC 110 may convert the digital value from the processor 108, into a continuously varying physical quantity, such as an analog electrical voltage.

The digital signal generated by the ADC 106 is received by the processor 108. The processor 108 is circuitry or logic enabled to implement functions or control execution of a set of instructions. The processor 108 may be a microprocessor, digital logic, firmware, digital signal processor, central processing unit, or other device suitable for controlling an electronic device including one or more hardware and software elements, executing software, instructions, programs, and applications, converting and processing signals and information, and performing other related tasks. The processor 108 may be a system which processes data that has been captured and encoded in a format recognizable by the data processing stream or has been created and stored by another component of the meter 100. The processor 108 may perform decoding/encoding, formatting, re-formatting, translation, or data conversion for signals, data, and information used within the meter 100. The processor 108 may be a single chip or integrated with other computing communications or sensor elements. For example, the processor 108 may include a memory for implementing various features.

The processor 108 may be configured to use polynomial conversion to determine a temperature offset necessary for the meter 100 to output an accurate reading. The polynomial conversion may be established based on the temperature characteristics of the gauge 102. The temperature characteristics of the gauge 102 may include the materials and conductors that form gauge 102 and other elements, sensor types, and how the gauge output is affected by changing temperatures. In one embodiment, the temperature drift of the output of the gauge 102 is measured in all possible conditions to determine the correction polynomial conversion equations, factors, or values. As a result, during real-time usage of the meter 100, the processor automatically determines the sensor offset based on the characteristics of the temperature sensor 104. In one embodiment, the processor 108 may include digital logic to perform the polynomial conversion. In another embodiment, a memory of the processor 108 may include a set of instructions or programs for implementing polynomial conversion.

In another embodiment, the processor 108 may store or access a look-up table. The look-up table may similarly store information, criteria, parameters, and temperature characteristics of the gauge 102. The look-up table may be utilized to generate the offset signal based on the state and conditions experienced by the gauge 102. In addition, the processor 108 may utilize linear interpolation of the data, information, or points within the look-up table to generate the offset signal. The information in the look-up table may be manipulated or applied to the conditions experienced with the meter 100.

The processor 108 may communicate an offset signal to the DAC 110. The DAC 110 converts the offset signal to an analog signal that may be referred to as the offset voltage. The offset voltage is a compensation or reference input to the instrumentation amplifier 112 that compensates for the thermal drift of the gauge 102. The instrumentation amplifier 112 is a type of differential amplifier that includes input buffers which eliminate the need for input impedance matching particularly suitable for testing equipment. The offset voltage from the DAC 110 offsets the effects of thermal drift. The offset voltage has the effect of shifting the entire range of the voltage measured by the gauge 102 in one direction or another based on the temperature effects on the gauge 102.

The illustrative embodiments allow the output from the gauge 102 or gauge voltage, to be fully amplified by the instrumentation amplifier 112 for conversion by the ADC 116. The thermal drift is removed by the offset voltage fed to the instrumentation amplifier 112 by the DAC 110 so that the entire signal span of the gauge voltage may be amplified by the instrumentation amplifier 112 and converted to a digital output by the ADC 116. The amplitude of the gauge voltage may remain unchanged because of the offset voltage received from the DAC 110 for maintaining the signal span and characteristics as further described in FIG. 2. As a result, the illustrative embodiments of the meter 100 may compensate for changes in temperature without sacrificing the span of the gauge voltage or accuracy when the amplified gauge voltage is converted to a digital equivalent by the ADC 116. Similarly, the final output from the meter 100 may be improved without increasing noise introduced within the different components of the meter 100.

Once the digital output is received by the processor from the ADC 116, some general filtering or signal processing may ensure that the meter output is stable and well formed. For example, the processor 108 may improve the speed of the signal, rise and fall times, and remove unwanted noise.

Figure 2:
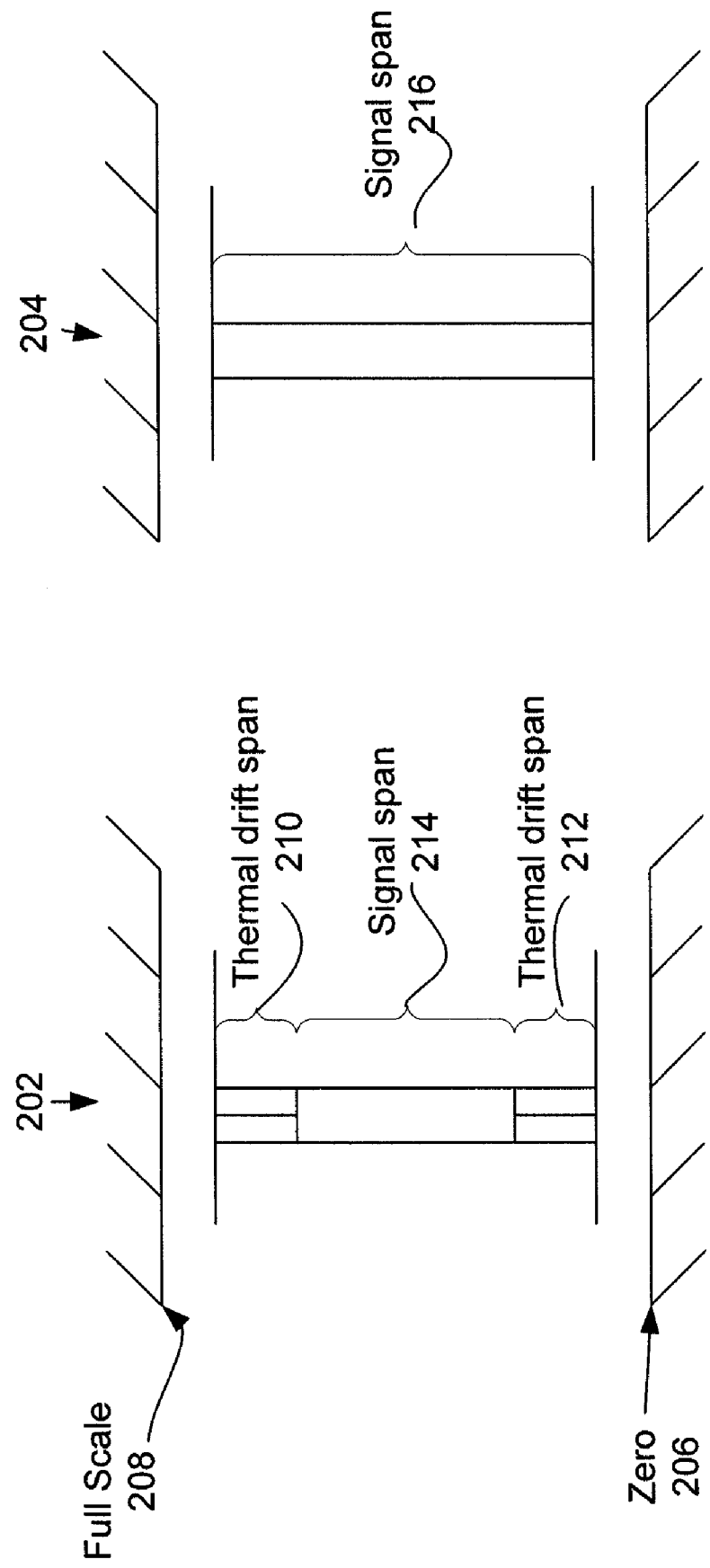
FIG. 2 is a pictorial representation of signal spans in accordance with an illustrative embodiment.

FIG. 2 is a pictorial representation of signal spans in accordance with an illustrative embodiment. FIG. 2 further illustrates the improvements of an illustrative embodiment over the prior art. FIG. 2 includes analog-to-digital converter gauge signal input 202, analog-to-digital converter gauge signal input 204, zero level 206, full scale level 208, thermal drift spans 210 and 212, and signal spans 214 and 216. The zero level 206 and full scale lever 208 represent the potential analog-to-digital converter gauge signal input range. In one embodiment, the various signals may represent voltages generated in a flow meter or pressure meter.

The analog-to-digital converter gauge signal input 202 represents a sensor that subtracts the thermal drift spans 210 and 212 from the full original span. The signal span 214 may be the output of a sensor that utilizes software processing to subtract the thermal drift spans 210 and 212 from the full signal span. The signal span 214 is significantly reduced because of the thermal drift spans 210 and 212 subtracted from the sensor signal due to thermal drift. The thermal drift error represented by the thermal drift spans 210 and 212 reduces the signal span 214 to a reduced usable range, as shown. As a result, the full accuracy of the analog-to-digital converter is reduced specially for gauge sensors that inherently have a large thermal drift error.

The analog-to-digital converter gauge signal input 204 is in accordance with an illustrative embodiment. In one embodiment, accuracy improvements are made by removing potential errors caused by thermal drift before digitizing the meter signal. As a result, the signal span 216 represents the full range of the gauge for conversion to a digital equivalent by the ADC. As a result, the meter improves accuracy without resorting to a high cost analog-to-digital converter with more bits of resolution. Similarly, the meter has improved signal-to-noise ratio utilizing the instrumentation amplifier and a simplified design.

Figure 3:
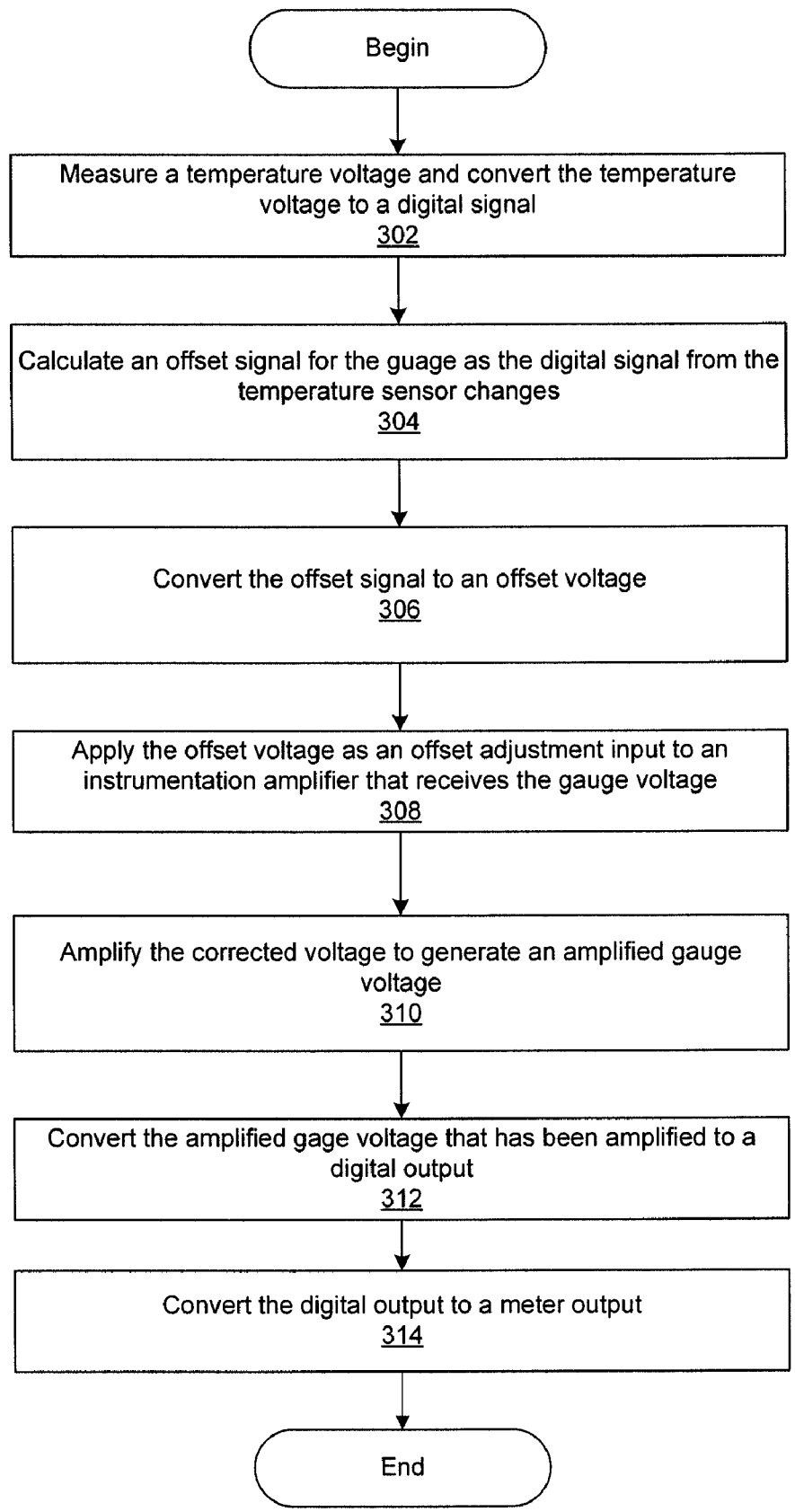
FIG. 3 is a flowchart of a process for compensating for thermal drift in a sensor in accordance with an illustrative embodiment.

FIG. 3 is a flowchart of a process for compensating for thermal drift in a meter in accordance with an illustrative embodiment. The process may be implemented by any number of meters or sensors measuring pressures and/or flows that are effected by thermal drift. The process may begin by measuring a temperature voltage and converting the temperature voltage to a digital signal (step 302). The temperature may be measured by a temperature sensor or circuit within the sensor. The temperature voltage may be converted from an analog signal to a digital signal using an analog-to-digital converter. For example, the temperature voltage measured as an analog signal may be converted to a binary signal.

Next, the processor calculates an offset signal for the gauge as the digital signal from the temperature sensor changes (step 304). The calculation of step 304 may be performed by a processor of the sensor. The digital signal naturally varies as the temperature measured with the meter environment or gauge fluctuates up or down. The offset signal may be calculated for the gauge to compensate for measurement errors that occur based on the temperature fluctuations. As previously described, the processor may utilize a polynomial conversion to generate the offset signal in a digital format.

Next, the meter converts the offset signal to an offset voltage (step 306). The offset voltage may be converted to an analog signal by a digital-to-analog converter.

The meter applies the offset voltage as an offset adjustment input to an instrumentation amplifier that receives the gauge voltage to generate a corrected voltage (step 308). In one embodiment, the gauge voltage of step 308 may represent the pressure or flow measurements of the gauge. The offset voltage shifts the gauge voltage to the correct measurement without limiting the voltage measurement range.

Next, the meter amplifies the corrected voltage to generate an amplified gauge voltage (step 310). The corrected voltage may be amplified by an instrumentation amplifier to a specified level or threshold for further processing. The meter converts the amplified gauge voltage that has been amplified to a digital output (step 312). The amplified gauge voltage may be converted to the digital output by an analog-to-digital converter. The meter further converts the digital output to a meter output (step 314). The digital output may be further shaped and processed during step 314. The meter may fully compensate for error introduced by thermal drift. As a result, the meter is able to better function in all temperature conditions while still maintaining the full signal span input (as shown in FIG. 2) to the analog-to-digital converter 116 of FIG. 1.

The previous detailed description is of a small number of embodiments for implementing the invention and is not intended to be limiting in scope. One skilled in the art will immediately envision the methods and variations used to implement this invention in other areas than those described in detail. The following claims set forth a number of the embodiments of the invention disclosed with greater particularity.

What is claimed as new and desired to be protected by Letters Patent of the United States is:

1. A method for compensating for thermal drift of a gauge of a thermal mass flow sensor in a meter, wherein the gauge is a wheatstone bridge, the method comprising:
   measuring a temperature of a heating element of the gauge as a temperature voltage, wherein constant power is applied to the heater element;
   converting the temperature voltage to a digital signal;
   processing the digital signal to generate an offset voltage in response to the digital signal, wherein the offset voltage is generated using polynomial conversion based on temperature characteristics of the gauge including the materials and conductors that form the gauge;
   applying the voltage as an input to an amplifier, the amplifier receiving as a second input a gauge voltage outputted by the gauge; and
   generating an output from the meter that corrects the gauge voltage using the offset voltage to compensates for thermal drift, wherein the thermal drift occurs only as a function of ambient temperature and not flow rate.

2. The method according to claim 1, further comprising:
   amplifying a corrected voltage utilizing the amplifier, wherein an amplified gauge voltage is generated by the amplifier based on the offset voltage and the gauge voltage.

3. The method according to claim 1, further comprising:
   converting the amplified gauge voltage that has been amplified to a digital output; and
   processing the digital output to generate the output for the meter.

4. The method according to claim 1, wherein an entire range of the gauge is processed due to the offset voltage.

5. The method according to claim 1, further comprising:
   determining an equation to utilize while performing the polynomial conversion.

6. The method according to claim 5, wherein the equation is determined based on the characteristics of the meter at a plurality of temperatures.

7. A meter comprising:
   a gauge of a thermal mass flow sensor operable to output a gauge voltage;
   a temperature sensor configured to measure a temperature in the gauge;
   an analog-to-digital converter (ADC) in communication with the temperature sensor, the ADC configured to convert a temperature voltage measured by the temperature sensor to a digital signal;
   a processor in communication with the ADC, the processor configured to generate an offset signal based on the digital signal, wherein the offset signal is generated using a look-up table that includes criteria, parameters, and temperature characteristics of the gauge, wherein information in the look-up table may be manipulated and applied to the conditions experienced with the meter to generate the offset signal;
   a digital to analog converter (DAC) in communication with the processor, the DAC configured to convert the offset signal to an offset voltage;
   an instrumentation amplifier in communication with the gauge, the instrumentation amplifier configured to receive the gauge voltage and the offset voltage and output an amplified gauge voltage; and a second ADC in communication with the instrumentation amplifier and the processor, the second ADC configured to convert the amplified gauge voltage to a digital output, wherein the digital output is processed by the processor for output from the meter.

8. The meter according to claim 7, wherein the instrumentation amplifier receives an entire signal span of the gauge voltage from the gauge for amplification and conversion by the ADC.

9. The meter according to claim 7, wherein the processor further processes the digital output removing noise and performing signals corrections to generate a meter output that is communicated from the meter to an external device.

10. A method for compensating for thermal drift of a gauge of a thermal mass flow sensor in a meter, the method comprising:

measuring a temperature in a meter as a temperature voltage;

converting the temperature voltage to a digital signal;

generating an offset voltage in response to the digital signal, wherein the offset voltage is generated using temperature characteristics of the gauge including the materials and conductors that form the gauge;

applying the offset voltage as an input to an amplifier, the amplifier receiving as a second input a gauge voltage to generate an amplified gauge voltage as an output, the gauge voltage generated by the gauge of the thermal mass flow sensor;

converting the amplified gauge voltage that has been amplified to a digital output; and processing the digital output to generate an output from the meter that corrects the gauge voltage using the offset voltage to compensate for thermal drift.

11. The method according to claim 10, wherein an entire range of the gauge voltage measured by the gauge is converted to the digital output.

* * * * *